(12) United States Patent
Blank et al.

(10) Patent No.: US 7,408,451 B2
(45) Date of Patent: Aug. 5, 2008

(54) VEHICLE REARVIEW MIRROR SYSTEM WITH PROTOCOL DETECTION

(75) Inventors: Rodney K Blank, Zeeland, MI (US); Kenneth L Schierbeek, Zeeland, MI (US); Marc A Smeyers, Zeeland, MI (US); Robert J Dykhouse, Byron Center, MI (US)

(73) Assignee: Donnelly Corporation, Holland, MI (US)

( * ) Notice: Subject to any disclaimer, the term of this patent is extended or adjusted under 35 U.S.C. 154(b) by 174 days.

(21) Appl. No.: 11/343,308

(22) Filed: Jan. 31, 2006

(65) Prior Publication Data

US 2006/0132941 A1 Jun. 22, 2006

Related U.S. Application Data

(63) Continuation of application No. 10/605,887, filed on Nov. 4, 2003, now Pat. No. 6,992,573.

(60) Provisional application No. 60/319,668, filed on Nov. 5, 2002.

(51) Int. Cl.
*B60Q 1/00* (2006.01)

(52) U.S. Cl. .................. 340/438; 340/461; 340/463

(58) Field of Classification Search ............... 340/436, 340/438, 441, 461, 463, 468, 469, 815.4, 340/933; 359/601, 602, 603, 604; 307/10.1
See application file for complete search history.

(56) References Cited

U.S. PATENT DOCUMENTS

| | | | |
|---|---|---|---|
| 4,917,477 A * | 4/1990 | Bechtel et al. ............. | 359/267 |
| 5,064,274 A | 11/1991 | Alten | |
| 5,715,093 A | 2/1998 | Schierbeek et al. | |
| 5,798,575 A | 8/1998 | O'Farrell et al. | |
| 5,871,275 A | 2/1999 | O'Farrell et al. | |
| 5,959,367 A | 9/1999 | O'Farrell et al. | |
| 6,089,721 A | 7/2000 | Schierbeek | |
| 6,175,164 B1 | 1/2001 | O'Farrell et al. | |
| 6,340,850 B2 | 1/2002 | O'Farrell et al. | |
| 6,355,920 B1 | 3/2002 | Schofield et al. | |
| 6,465,904 B2 | 10/2002 | O'Farrell et al. | |
| 6,590,193 B2 | 7/2003 | Schofield et al. | |
| 6,728,393 B2 * | 4/2004 | Stam et al. ............... | 382/104 |
| 6,918,674 B2 * | 7/2005 | Drummond et al. ......... | 359/604 |
| 6,992,573 B2 | 1/2006 | Blank et al. | |

OTHER PUBLICATIONS

Commonly assigned U.S. Appl. No. 10/614,234, filed Jul. 7, 2003, entitled Light-Responsive Vehicle Control Such as an Electro-Optic Rearview Mirror System That is Adaptive to Vehicle Configuration.

* cited by examiner

*Primary Examiner*—Van T. Trieu
(74) *Attorney, Agent, or Firm*—Van Dyke, Gardner, Linn & Burkhart LLP

(57) ABSTRACT

An automatic dimming vehicle mirror system includes an automatic dimming mirror assembly having automatic dimming circuitry. The automatic dimming circuitry includes a mirror control and at least a first silicon-based photo sensor and a second silicon-based photo sensor. The first silicon-based photo sensor is sensitive to both visible light and infrared light. The second silicon-based photo sensor is sensitive principally to infrared light. The mirror control distinguishes headlamp sources from non-headlamp sources by a ratio of a signal indicative of light detected by the first photo sensor to a signal indicative of light detected by the second photo sensor.

30 Claims, 3 Drawing Sheets

US 7,408,451 B2

VEHICLE REARVIEW MIRROR SYSTEM WITH PROTOCOL DETECTION

This application is a continuation of prior application Ser. No. 10/605,887, filed on Nov. 4, 2003, now U.S. Pat. No. 6,992,573, which claims priority from U.S. provisional patent application Ser. No. 60/319,668, filed on Nov. 5, 2002, the disclosures of which are hereby incorporated herein by reference in their entirety.

BACKGROUND OF INVENTION

The present invention is directed to a vehicular rearview mirror system and, in particular, a vehicular rearview mirror system in which an electro-optic reflective element assumes a partial reflectance level in response to a drive signal.

It is known for a mirror control to be responsive to an output of a vehicle control. For example, it is known to cause the reflectance level of an electro-optic reflective element to be forced into a high reflectance level when the vehicle is placed in reverse gear. An example of such a system is disclosed in commonly assigned U.S. Pat. No. 5,715,093 issued to Schierbeek et al., the disclosure of which is hereby incorporated herein by reference. The circuit that established the reflectance level of the reflective element monitors a switch or circuit that is actuated by the vehicle gearshift and which provides an indication that the gearshift is placed in reverse gear. In some vehicles, the reverse-gear indication has a protocol in which the indication changes from a low voltage level to a high voltage level when the vehicle is placed in reverse gear. In other vehicles, the protocol is that the reverse-gear indication changes from a high level to a low voltage level when the vehicle is placed in reverse gear. It is desirable to be able to install the same vehicle rearview mirror system in various vehicles irrespective of the protocol of the reverse-gear indication signal. The protocol, also known as a handshake, is the relationship between the reverse-gear indication signals when the vehicle is in reverse gear verses when it is not in reverse gear.

SUMMARY OF INVENTION

The present invention provides a vehicle rearview mirror system that is tolerant of different protocols of an output of a vehicle control. In this manner, the rearview mirror system can be used with various types of vehicles with modifications to the circuit.

A vehicular rearview mirror system suitable for use with a vehicle control, the vehicle control generating an output having a particular protocol representing a state of the output, according to an aspect of the invention, including a variable reflective element which assumes a partial reflectance level in response to a drive signal. The rearview mirror system further includes a mirror control that is responsive to the output of the vehicle control for generating at least one mirror control output. The at least one mirror control output includes a value for the drive signal. The mirror control determines the protocol of the output of the vehicle control including monitoring the output of the vehicle control in attempting to conclude a state of the output of the vehicle control.

The output of the vehicle control may be gear status information, engine information, alarm information, or door status information. In the case of the output being gear status information, the mirror control attempts to conclude a state of the output being whether the vehicle is in reverse gear or the vehicle is not in reverse gear. In the case where the output of the vehicle control is door status information, the mirror control attempts to conclude a state of the output being whether the vehicle doors are closed or a vehicle door is not closed. The at least one mirror control output may control a lighting assembly associated with an interior rearview mirror assembly and/or an exterior rearview mirror assembly.

The mirror control may include a microcomputer having software and the microcomputer determines the protocol by software processing. The microcomputer may monitor the output of the vehicle control upon starting of the vehicle and/or upon running of the vehicle. The rearview mirror system may include at least one light sensor and the mirror control may establish a value for the drive signal in response to an output of the at least one light sensor.

A vehicle rearview mirror system for use with a vehicle having a reverse gear and a reverse-gear indication wherein the reverse-gear indication has a particular protocol, according to an aspect of the invention, includes an electro-optic reflective element and a controller. The controller establishes a reflectance level of the reflective element including establishing a particular reflectance level in response to the reverse-gear indication indicating that the vehicle is in reverse gear. The controller determines the protocol of the reverse-gear indication including monitoring the reverse-gear indication and attempting to determine when the vehicle is in reverse gear and/or when the vehicle is not in reverse gear.

The controller may be a microcomputer having software and the microcomputer determines the protocol of the reverse-gear indication by software processing. The microcomputer may determine the reverse-gear protocol at least in part by monitoring a protocol of the reverse-gear indication upon starting of the vehicle. The microcomputer may also determine the reverse-gear protocol at least in part by monitoring a protocol of the reverse-gear indication during running of the vehicle. The microcomputer may determine the reverse-gear protocol by both monitoring the protocol of the reverse-gear indication upon starting of the vehicle and during running of the vehicle. The controller may maintain a reverse-inhibit-running parameter and a reverse-inhibit-ignition-cycle parameter.

These and other objects, advantages, and features of this invention will become apparent upon review of the following specification in conjunction with the drawings.

DESCRIPTION OF THE PREFERRED EMBODIMENT

Figure 1:
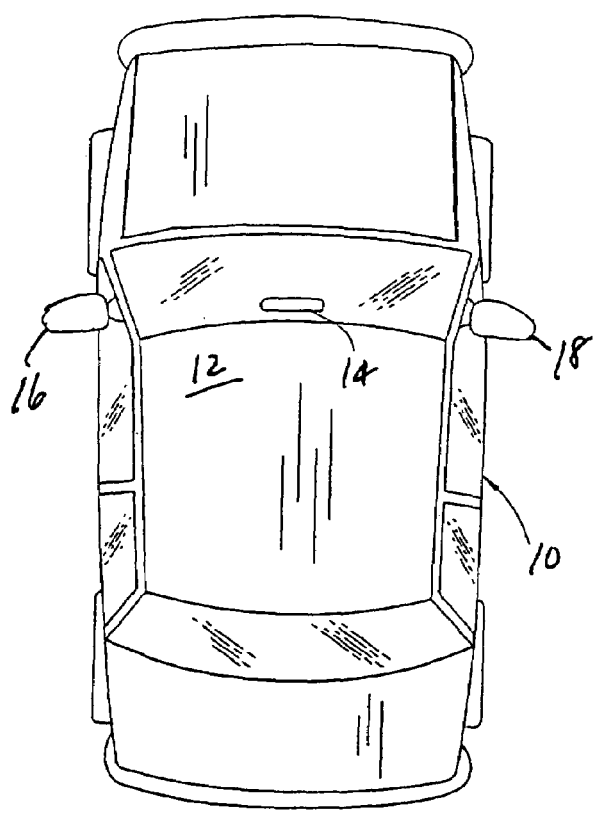
FIG. 1 is a top plan view of a vehicle equipped with a rearview mirror system, according to the invention.
Figure 2:
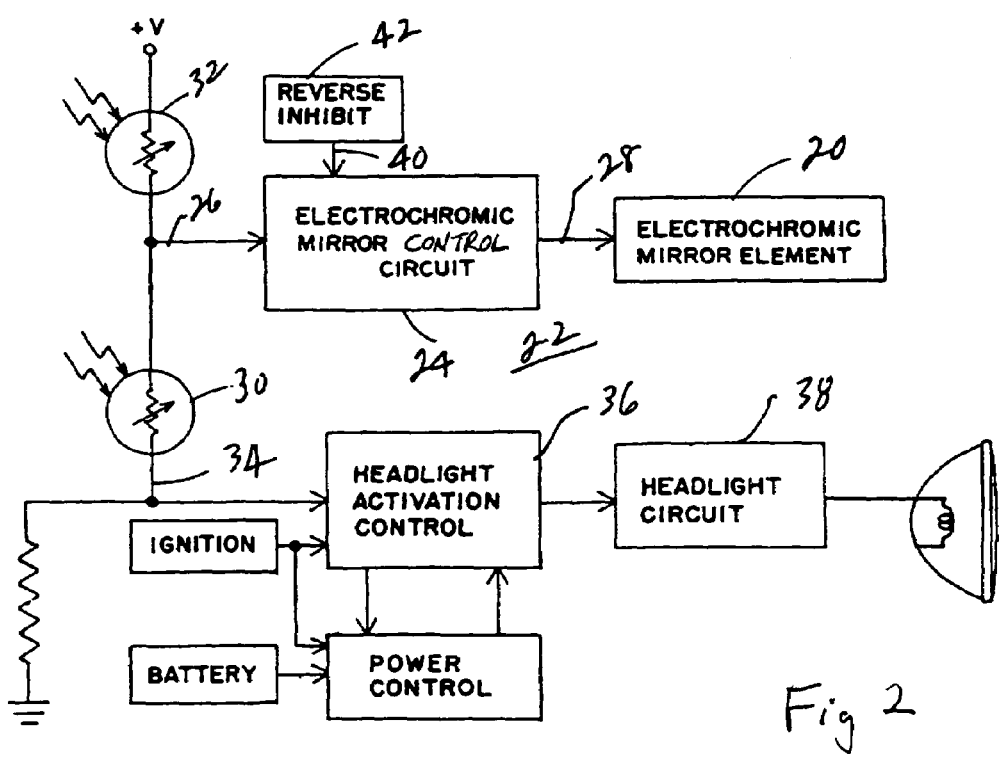
FIG. 2 is a block diagram of a rearview mirror system useful with the invention.

Referring now to the drawings and the illustrative embodiments depicted therein, a vehicle 10 is equipped with a vehicle rearview mirror system 12 which may include an interior mirror assembly 14, a driver-side exterior mirror assembly 16, and/or a passenger-side exterior mirror assembly 18 (FIG. 1). Each mirror assembly 14, 16, 18 includes an electro-optic reflective element, such as an electrochromic mirror element 20, each mirror assembly further includes a mirror control circuit 22 including a mirror controller 24 that determines a reflectance level of the reflective element 20 of one or more of the mirror assemblies (FIG. 2). Mirror controller 24 may receive an input 26 indicative of light levels and produces an output 28 which causes reflective element 20 to assume a particular reflectance level. Input 26 may be produced by a glare light sensor 30 and an ambient light sensor 32. Output 28 may be of any configuration known in the art. One example may be a pulse-width-modulated signal having a variable duty cycle, the value of which establishes a reflectance level of reflective element 20, as disclosed in commonly assigned U.S. Pat. Nos. 6,056,410 issued to Hoekstra et al. and 6,089,721 issued to Schierbeek, the disclosures of which are hereby incorporated herein by reference. The operation of control 22 is disclosed in detail in commonly assigned U.S. Pat. No. 5,715,093 issued to Schierbeek et al. for a VEHICLE REARVIEW MIRROR SYSTEM WITH AUTOMATIC HEADLIGHT ACTIVATION, the disclosure of which is hereby incorporated herein by reference and will not be repeated herein. Glare and ambient light sensors 30, 32 may also be used as an input 34 to a headlight activation control 36 for controlling a headlight circuit 38 as disclosed in the '093 patent. However, it should be understood that the invention may be used with an electrochromic mirror circuit which does not also include headlight activation.

Mirror controller 24 additionally receives as input from a vehicle control (not shown). The vehicle control provides an output having a protocol. By way of example, the vehicle control output may be a reverse-gear indication 40 from a reverse-gear circuit 42. Reverse-gear circuit 42 is responsive to the vehicle shifter (not shown) or other indication of the gear in which the vehicle is placed, and produces reverse-gear indication 40 when the vehicle shifter is placed in reverse gear. Reverse-gear indication 40 may be of a protocol wherein the line goes from a low, or grounded state, to a high, or powered state, when the vehicle is placed in reverse gear. Alternatively, the protocol of reverse-gear indication 40 may be that the line goes from a high, or powered state, to a low, or grounded state, when the vehicle is placed in reverse gear. Mirror controller 24 is provided with appropriate biasing resistors in order to accommodate protocol of reverse-gear indication 40. The arrangement of such biasing circuit is well within the skill of the ordinary practitioner. Other protocols may be possible and would be specific to the particular vehicle 10 in which the vehicle rearview mirror system 12 is installed. Mirror controller 24 may be responsive to other information provided by the vehicle control in an unknown protocol. Examples of such other information may include engine information, alarm information, door status information, or the like. It is known to cause a lighting assembly associated with a rearview mirror system to be turned on in response to vehicle door status information. Examples of such systems are disclosed in commonly assigned U.S. Pat. Nos. 5,497,305; 5,497,307; 5,669,689 and 5,669,704 in which a lighting assembly is associated with an exterior mirror assembly and U.S. Pat. No. 5,178,448 in which a lighting assembly is associated with an interior rearview mirror assembly, the disclosures of which are collectively hereby incorporated herein by reference.

Figure 3:
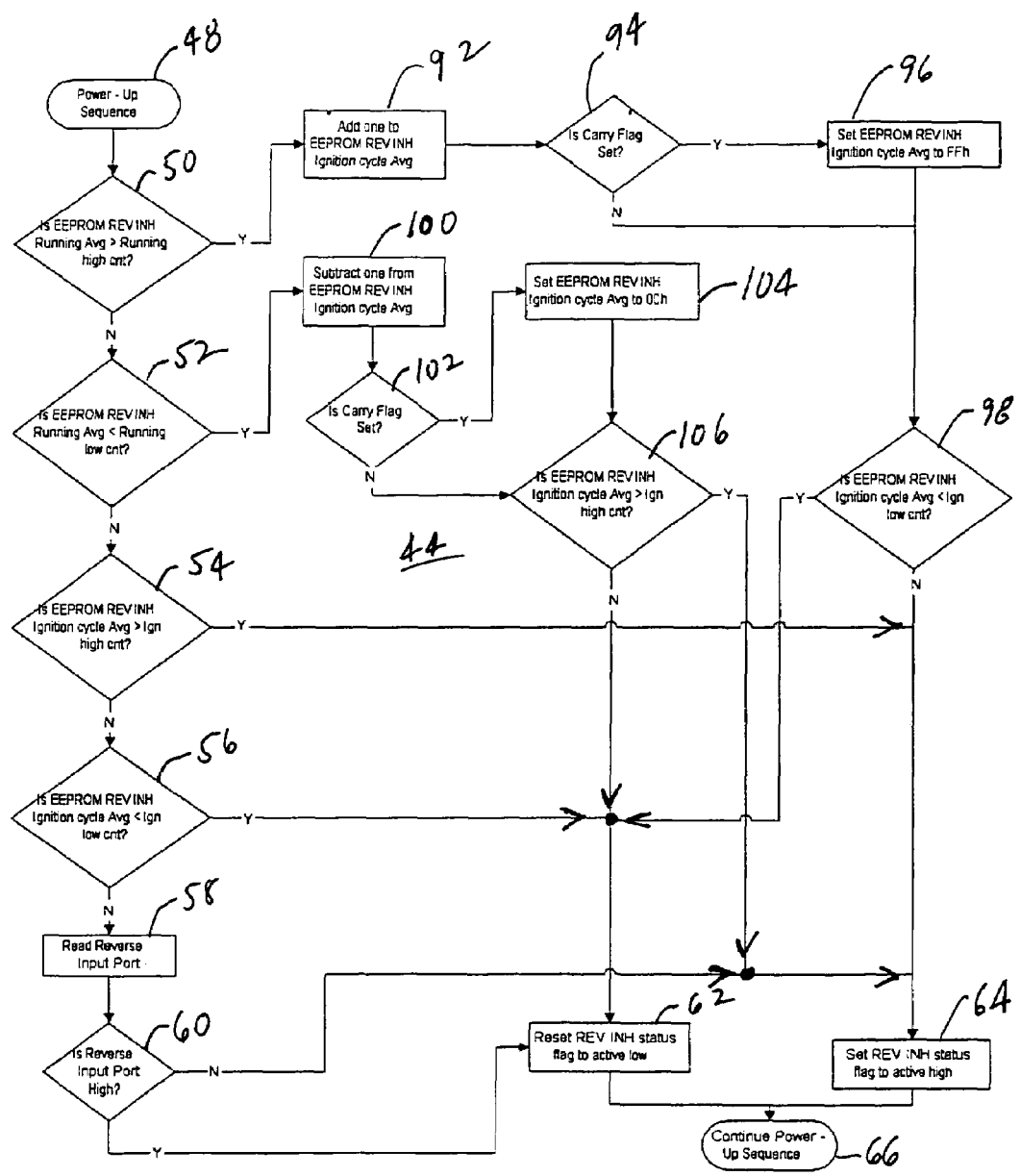
FIG. 3 is a flowchart of a power-up sequence, according to an embodiment of the invention.
Figure 4:
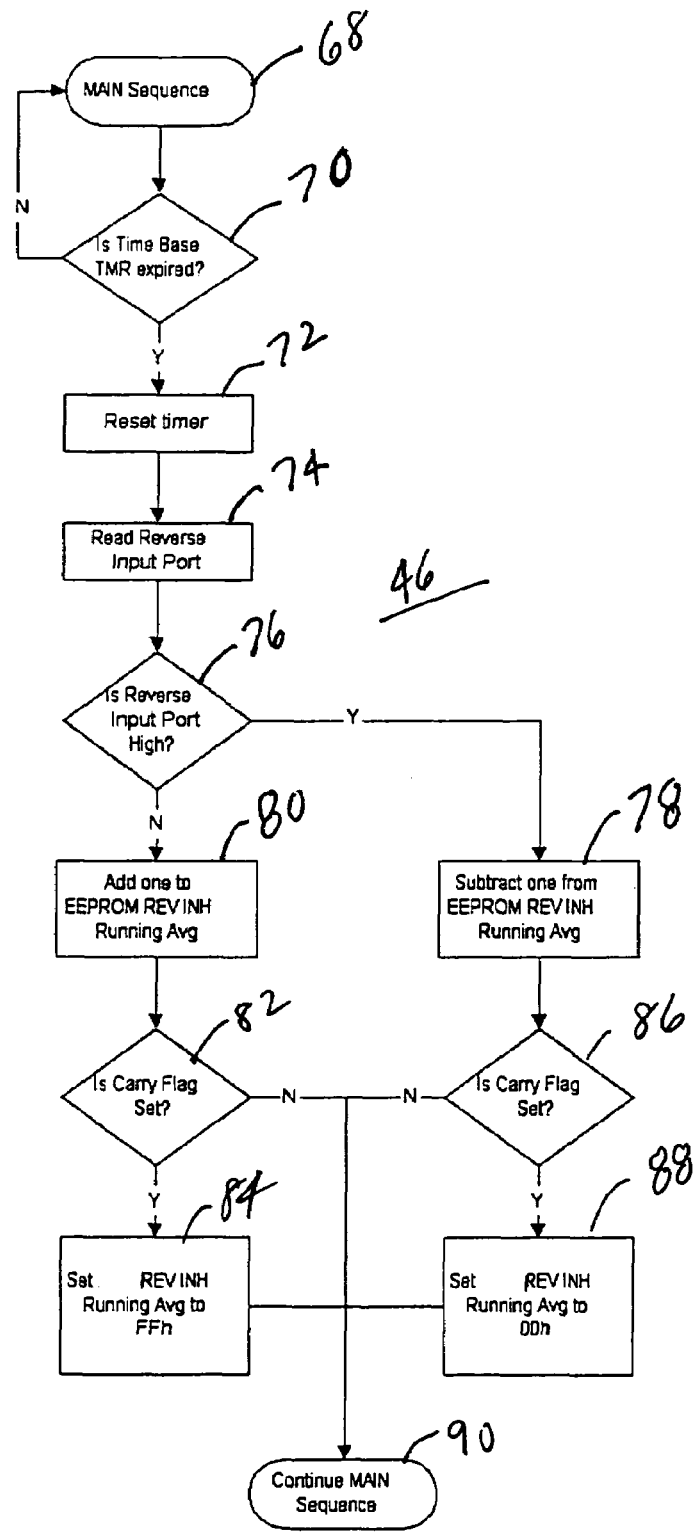
FIG. 4 is a flowchart of a main sequence, according to an embodiment of the invention.

Mirror controller 24 may be a microcomputer, or microprocessor, having non-volatile memory, such as in the form of electrically erasable programmable read-only memory (EEPROM), which is capable of storing data even when the vehicle is turned off. The microcomputer may also have programming code to carry out a control program having a power up sequence routine 44 (FIG. 3) and/or a main sequence routine 46 (FIG. 4).

Power-up sequence 44 may be carried out every time the vehicle is started, namely, whenever the vehicle's ignition line is powered. However, it should be understood that there are circumstances when the ignition line is powered but the vehicle has not yet started, such as when the ignition switch is turned past the accessory position while the occupant is operating an accessory. However, under usual circumstances, the powering of the ignition line is an indication that the vehicle is being operated. Controller 24 maintains a parameter called "reverse-inhibit-running average (or running average)," which is compared with two limits as follows:

Running high count
Running low count and a "reverse-inhibit-ignition-cycle average (or ignition-cycle average)" parameter, which is compared with two limits as follows:

Ignition high count
Ignition low count

As will be set forth in more detail below, the running average parameter is a numerical value that is indexed at a particular frequency, such as every 30 seconds, every minute, every 5 minutes, or the like, whenever the vehicle ignition is energized. The running average parameter is maintained by main sequence 46. Running high count, running low count, ignition high count and ignition low count in the illustrative embodiment are fixed parameters against which the running average parameter is compared by power-up sequence 44, as will be set forth in more detail below. However, the skilled artisan may choose to make these parameters variable according to some condition or conditions. As such, running high count, running low count, ignition high count and ignition low count can be parameters that are set within the computer program or may be stored in the EEPROM. When the vehicle is initially produced, or when rearview mirror system 12 is initially installed in the vehicle, the parameters reverse-inhibit-running average and reverse-inhibit-ignition-cycle average are set to a value which represents a neutral condition, typically midway between the running average high count and the running average low count in the case of reverse-inhibit-running average and midway between the ignition high count and the ignition low count in the case of the reverse-inhibit-ignition-cycle average. For example, if an 8-bit register is used, which can register between 0 and 255, reverse-inhibit-running average and reverse-inhibit-ignition-cycle average may be set to the number 128. The running average low count and the ignition low count may be set to a number close to 0, such as 20, although these are for illustration only. Likewise, the running average high count and the ignition high count may be set to a value closer to 255, such as 235. Again, these being by way of example only.

Upon initiation of the power-up sequence at 48, a series of comparisons 50, 52, 54 and 56 may be carried out. In comparison 50, it is determined whether the running average parameter is greater than the running high count, which is suggestive of a reverse-gear indication high protocol. If not, it is determined at 52 whether the running average parameter is less than the running low count, which is suggestive of a reverse-gear indication active low protocol. If neither comparison 50 nor 52 are true, it is determined at 54 whether the ignition-cycle average parameter is greater than the ignition high count. If so, it is concluded that the reverse gear indication is an active high protocol. If comparison 54 is not true, it is determined at 56 whether the ignition-cycle parameter average is less than the ignition low count. If so, it is concluded that the reverse-gear indication is an active low protocol.

If neither comparison 50, 52, 54 or 56 is true, as would occur upon the initial power-up of the vehicle, controller 24 reads the reverse input 40 at 58 and determines at 60 whether the input port is high or not. If it is determined at 60 that the reverse input port is high, it is at least initially concluded that a reverse-gear indication is an active low protocol and a status flag is set at 62 to active low protocol. If it is determined at 60 that the reverse input port is not high, it is initially concluded that the reverse-gear indication is an active high and an active high flag is set at 64. This conclusion is based upon an assumption that most likely the vehicle will not be in reverse gear when it is initially powered. However, this assumption may not always be true, such as in the case when a manual transmission vehicle is started in reverse gear with the clutch depressed. That is why the initial setting of the reverse-inhibit status flag is tentative and subject to reversal at a later time. After the reverse-inhibit status flag is set, the power-up sequence is exited at 66.

Attention will now be turned to the main sequence 46 in FIG. 4. Main sequence 46 may be carried out for the entire duration that the vehicle ignition is powered. The main sequence begins at 68, and a determination is made at 70 whether a particular time base TMR has expired. The timer may be set for any desirable period, such as 30 seconds, 1 minute, 5 minutes, or the like. The particular duration of the interval is a matter of design choice and can be appropriately selected by the skilled artisan. If it is determined at 70 that the time base has not expired, the loop is repeated until it is expired, at which time the timer is reset at 72. The reverse input port 40 is read at 74 and a determination is made at 76 whether the input port is high. If it is determined at 76 that the reverse input port is high, the running average parameter is indexed downwardly at 78. If it is determined at 76 that the reverse-input port is not high, the running average parameter is indexed upwardly at 80. This logic is based upon the assumption that a vehicle, over time, will more likely be operated in reverse gear much less often than in a gear other than reverse gear. As this logic increases or decreases the value of reverse-inhibit-running average, the carry flag may be set to an upper overflow state from adding to the running average or to a lower underflow state by subtracting from the reverse-inhibit-running average. If main sequence 46 has added to the value of the running average parameter at 80, it is determined at 82 whether the upper carry flag has been set, indicating that the count has reached the upper value. In order to avoid resetting of the register to 0, the control responds to the carry flag being set at 82 by setting at 84 the value of the running average parameter to the hexadecimal value of FFH, which is the maximum value. After the main sequence subtracts from the reverse-inhibit-running average at 78, it is determined at 86 whether the lower underflow carry flag has been set. If the carry flag is set at 86, the program sets at 88 the running average parameter to a 00H hexadecimal value. If it is determined at 82 or 86 that the respective carry flags are not set, the main sequence is continued at 90.

Returning now to the power-up sequence 44, if it is determined at 50 that the running average parameter is greater than the running high count parameter, the program indexes upwardly at 92 the parameter ignition-cycle average. It is then determined at 94 whether the value of the ignition-cycle average has reached an upper limit and, therefore, the carry flag is set. If so, the value of the ignition-cycle average is set at 96 to the hexadecimal value of FFH. Whether or not the carry flag is set, the ignition-cycle average parameter is compared with the ignition low count at 98. If the ignition-cycle average is less than the ignition low count, the reverse-gear indication is set at 62 to an active low protocol. If the ignition-cycle average is not less than the ignition low count, the reverse-gear indication protocol is set at 64 to active high protocol.

If it is determined at 50 that the reverse-inhibit-running average is not greater than the running high count, and it is determined at 52 that the reverse-inhibit-running average is less than the running low count, the parameter ignition-cycle average is decremented downwardly at 100. If it is determined at 102 that the carry flag is set, indicating that the value in the register has reached a low underflow level, the value for the ignition-cycle average is set at 104 to 00H. It is then determined at 106 if the ignition-cycle average is greater than the ignition high count. If so, the reverse-gear indication protocol is set at 64 to the active high protocol. If it is determined at 106 that the ignition-cycle average is not greater than the ignition high count, the reverse-gear indication protocol is set at 62 to the active low protocol. The power-up sequence is exited at 66.

Thus, the software-based protocol, or handshake, determining technique disclosed herein utilizes a logical sequence of events in order to determine the protocol, or handshake, of an output of the vehicle control. One example of such output of the vehicle control is the reverse-gear indication. Upon initial start-up of the vehicle, the controller merely monitors, the reverse input port 40 and determines whether the port is high or low. On the basis of the assumption about the vehicle, such as that the vehicle is not in reverse gear, which assumption may or may not be true, an initial establishment of the protocol is made. However, the value of the running average parameter is repeatedly adjusted as the vehicle is operated using the assumption that the vehicle will more often be in a particular state than not in that state, such as that the vehicle will more often be in a gear other than reverse gear. Once the value of the running average reaches an extremely high or an extremely low value, the protocol for the output of the vehicle control is updated to a, presumably, more appropriate determination. The technique may continue to maintain the running average throughout the life of the vehicle to ensure that a proper protocol has been ascertained.

Whenever the vehicle is powered up, a fresh comparison is made between the value of reverse-inhibit-running average and the running high count and running low count in order to determine whether the value of reverse-inhibit-running average has exceeded the running high count or well below the running low count. If so, another parameter, reverse-inhibit-ignition-cycle average, is either incremented upwardly or decremented downwardly. If the value of ignition-cycle average exceeds an ignition high count or falls below an ignition low count, the reverse-gear indication protocol is reset to the value indicated thereby. The purpose of utilizing an ignition-cycle average that is incremented or decremented only upon vehicle power-up is in order to reduce the likelihood of anomalies affecting the performance of control 22. For example, should a vehicle be left with the ignition running and in reverse gear, such as may happen when an owner is washing/waxing the vehicle with the radio turned on and the vehicle switch in the ignition position, the value of the reverse-inhibit-running average may reach an erroneous result because the vehicle may momentarily spend that time in reverse gear. However, during such interval, the vehicle is not powered up or is powered up only once. Therefore, although the value of the reverse-inhibit-running average may suggest an incorrect value for the reverse-gear indication protocol, the ignition-cycle average parameter would not. The ignition-cycle average value would override the value determined by reverse-inhibit-running average.

As indicated above, automatic dimming circuitry used in electrochromic mirror assemblies (such as disclosed in U.S. Pat. Nos. 4,793,690; 4,886,960; 4,799,768; 4,443,057 and 4,917,477, the entire disclosures of which are hereby incorporated by reference herein) may utilize one or more (typically two) photo sensors (such as photo resistors or photo diodes or photo transistors) to detect glaring and/or ambient lighting. For example, a silicon photo sensor, such as a TSL235R Light-to-Frequency converter (available from Texas Advanced Optoelectronic Solutions Inc. of Plano, Tex.), can be used as such photo sensors. Such light-to-frequency converters comprise the combination of a silicon photodiode and a current-to-frequency converter on a single monolithic CMOS integrated circuit. Alternately, a photo sensor that converts ambient light to a digital signal capable of direct feed into a microprocessor (or into a vehicle bus system, such as a LIN or CAN system or an SMBus) can be used. For example, a TSL2550 light sensor can be used that converts light intensity to a digital output (and is available from Texas Advanced Optoelectronic Solutions Inc. of Plano, Tex.). The TSL2550 Light-to-Digital photo sensor uses an all-silicon technique that combines two photodetectors to measure light brightness as perceived by the human eye, and calculates light intensity in units of lux. One photo sensor is sensitive to both visible and infrared light, while the other is sensitive only to infrared light. By such a combination, the infrared component of detected light is compensated for, and the output of the part is approximate the response of the human eye, thus obviating a need for a photopic filter. The ratio of infrared to visible light can be calculated and used to determine the type of light source (for example, incandescent or sunlight). Thus, for example, glaring light from headlamps (typically incandescent or high intensity discharge) can be distinguished from moonlight, sunlight, neon light, and the like.

Thus, it is seen that the present invention provides a technique for determining the protocol of the output of the vehicle control. This, advantageously, allows the same vehicular rearview mirror system to be utilized on cars having different output protocols. Advantageously, the invention may be implemented in software, thereby reducing hardware expenses associated with the function. This is because the microcomputer may already be in place in the vehicle mirror control system, such as in order to establish a reflectance level of the electrochromic mirror element. Therefore, any hardware overhead associated with this function would be negligible. Furthermore, the software solution can be carried utilizing an 8-bit register, which further reduces the amount of software resources necessary to implement the invention.

Changes and modifications in the specifically described embodiments can be carried out without departing from the principles of the invention which is intended to be limited only by the scope of the appended claims, as interpreted according to the principles of patent law including the Doctrine of Equivalents.

The invention claimed is:

1. An automatic dimming vehicle mirror system, said mirror system comprising:
    an automatic dimming mirror assembly, said mirror assembly comprising automatic dimming circuitry;
    said automatic dimming circuitry comprising a mirror control and at least a first silicon-based photo sensor and a second silicon-based photo sensor;
    said first silicon-based photo sensor being sensitive to both visible light and infrared light;
    said second silicon-based photo sensor being sensitive principally to infrared light; and
    said mirror control distinguishing headlamp sources from non-headlamp sources by a ratio of a signal indicative of light detected by said first silicon-based photo sensor to a signal indicative of light detected by said second silicon-based photo sensor.

2. The mirror system of claim 1 wherein at least one of said first and second silicon-based photo sensors comprises a light-to-frequency converter.

3. The mirror system of claim 2 wherein said light-to-frequency converter comprises a current-to-frequency converter.

4. The mirror system of claim 1 wherein at least one of said first and second silicon-based photo sensors comprises a photo diode.

5. The mirror system of claim 1 wherein at least one of said first and second silicon-based photo sensors comprises a CMOS device.

6. The mirror system of claim 5 wherein said CMOS device comprises a monolithic device.

7. The mirror system of claim 1 wherein said non-headlamp sources include at least one chosen from sunlight, moonlight and neon light.

8. The mirror system of claim 1 wherein said headlamp sources include at least one chosen from an incandescent light source and a high intensity light source.

9. The mirror system of claim 1 wherein said vehicle comprises a vehicle control, said vehicle control generating an output having a particular protocol representing a state of said output, said mirror control determining the protocol of said output.

10. The mirror system of claim 9 wherein said mirror control monitors said output of said vehicle control and determines the protocol of said output at least in part by maintaining a running parameter.

11. An automatic dimming vehicle mirror system, said mirror system comprising:
    an automatic dimming mirror assembly, said mirror assembly comprising automatic dimming circuitry;
    said automatic dimming circuitry comprising a mirror control and at least a first photo diode sensor and a second photo diode sensor;
    said first photo diode sensor being sensitive to both visible light and infrared light;
    said second photo diode sensor being sensitive principally to infrared light; and
    said mirror control distinguishing headlamp sources from non-headlamp sources by a ratio of a signal indicative of light detected by said first photo diode sensor to a signal indicative of light detected by said second photo diode sensor.

12. The mirror system of claim 11 wherein at least one of said first and second photo diode sensors comprises a light-to-frequency converter.

13. The mirror system of claim 12 wherein said light-to-frequency converter comprises a current-to-frequency converter.

14. The mirror system of claim 11 wherein at least one of said first and second photo diode sensors comprises silicon-based photo diode sensors.

15. The mirror system of claim 11 wherein at least one of said first and second silicon-based photo diode sensors comprises a CMOS device.

16. The mirror system of claim 15 wherein said CMOS device comprises a monolithic device.

17. The mirror system of claim 11 wherein said non-head lamp sources include at least one chosen from sunlight, moonlight and neon light.

18. The mirror system of claim 11 wherein said headlamp sources include at least one chosen from an incandescent light source and a high intensity light source.

19. The mirror system of claim 11 wherein said vehicle comprises a vehicle control, said vehicle control generating an output having a particular protocol representing a state of said output, said mirror control determining the protocol of said output.

20. The mirror system of claim 19 wherein said mirror control monitors said output of said vehicle control and determines the protocol of said output at least in part by maintaining a running parameter.

21. An automatic dimming vehicle mirror system, said mirror system comprising:
   an automatic dimming mirror assembly, said mirror assembly comprising automatic dimming circuitry;
   said automatic dimming circuitry comprising a mirror control and at least a first light-to-frequency photo sensor and a second silicon-based light-to-frequency photo sensor;
   said first light-to-frequency photo sensor being sensitive to both visible light and infrared light;
   said second light-to-frequency photo sensor being sensitive principally to infrared light; and
   said mirror control distinguishing headlamp sources from non-headlamp sources by a ratio of a signal indicative of light detected by said first light-to-frequency photo sensor to a signal indicative of light detected by said second light-to-frequency photo sensor.

22. The mirror system of claim 21 wherein at least one of said first and second light-to-frequency photo sensors comprises a current-to-frequency converter.

23. The mirror system of claim 21 wherein at least one of said first and second light-to-frequency photo sensor comprises a silicon-based photo sensor.

24. The mirror system of claim 21 wherein at least one of said first and second light-to-frequency photo sensor comprises a silicon diode.

25. The mirror system of claim 21 wherein at least one of said first and second light-to-frequency photo sensor comprises a CMOS device.

26. The mirror system of claim 25 wherein said CMOS device comprises a monolithic device.

27. The mirror system of claim 21 wherein said non-headlamp sources include at least one chosen from sunlight, moonlight and neon light.

28. The mirror system of claim 21 wherein said headlamp sources include at least one chosen from an incandescent light source and a high intensity light source.

29. The mirror system of claim 21 wherein said vehicle comprises a vehicle control, said vehicle control generating an output having a particular protocol representing a state of said output, said mirror control determining the protocol of said output.

30. The mirror system of claim 29 wherein said mirror control monitors said output of said vehicle control and determines the protocol of said output at least in part by maintaining a running parameter.

* * * * *